United States Patent [19]

Carpenter, Jr.

[11] Patent Number: 5,043,527
[45] Date of Patent: Aug. 27, 1991

[54] DISSIPATION ARRAY SYSTEMS FOR LIGHTNING PROTECTION

[75] Inventor: Roy B. Carpenter, Jr., Boulder, Colo.

[73] Assignee: Lightning Eliminators & Consultants, Inc., Boulder, Colo.

[21] Appl. No.: 327,531

[22] Filed: Mar. 23, 1989

Related U.S. Application Data

[63] Continuation-in-part of Ser. No. 180,195, Apr. 11, 1988, abandoned.

[51] Int. Cl.⁵ .................................................. H02G 13/00
[52] U.S. Cl. ......................................... 174/2; 174/4 R
[58] Field of Search ............... 174/2, 3, 4 R; 361/117, 361/215, 216, 218, 220, 221, 222; 307/149; 343/885, 899

[56] References Cited

U.S. PATENT DOCUMENTS

| | | | |
|---|---|---|---|
| 1,096 | 3/1839 | Barber | 174/4 R |
| 234,173 | 11/1880 | Chambers | 174/2 |
| 234,484 | 11/1880 | Knudson | 174/2 |
| 250,950 | 12/1881 | Newhall | 174/2 |
| 286,086 | 10/1883 | Spang | 174/2 |
| 315,679 | 4/1885 | Upton | 174/2 |
| 357,050 | 2/1887 | Vail | 174/2 |
| 1,193,848 | 8/1916 | Van Horn | 174/4 R X |
| 1,743,526 | 1/1930 | Cage | 174/2 |
| 1,757,172 | 5/1930 | Cazel et al. | 174/4 R X |
| 3,120,625 | 2/1964 | Smith | 351/218 |
| 4,180,698 | 12/1979 | Carpenter, Jr. | 174/2 |
| 4,605,814 | 8/1986 | Gillem | 174/2 |
| 4,910,636 | 3/1990 | Sadler et al. | 174/4 R X |

FOREIGN PATENT DOCUMENTS

| | | | |
|---|---|---|---|
| 552372 | 1/1923 | France | 174/4 R |
| 1015590 | 8/1952 | France | 361/218 |
| 262841 | 2/1929 | Italy | 174/3 |
| 284311 | 4/1931 | Italy | 174/4 R |
| 296647 | 9/1928 | United Kingdom | 174/3 |
| 481242 | 3/1939 | United Kingdom | 343/899 |

Primary Examiner—Laramie E. Askin

[57] ABSTRACT

Simple lightning rod systems divert a lightning stroke away from a protected facility. They do nothing to prevent a lightning stroke from occurring. The present invention represents the state of the art improvements in lightning prevention systems. These prevention systems are termed dissipating systems because they neutralize the charge differential between the cloud and the protected facility before the flashover point occurs. The flashover point is seen as lightning. The present dissipative systems leak off the charge differential slowly before the flashover point is reached. The present invention pinpoints the critical design parameters for the optimization of dissipative array systems. The critical design parameters include the number, size and spacing of both the ionizer points and their conductive wires. These Dissipation Array Systems (DAS) provide up to 100% prevention protection from lightning strokes.

5 Claims, 5 Drawing Sheets

DISSIPATION ARRAY SYSTEMS FOR LIGHTNING PROTECTION

This is a continuation in part of Pat. application, Ser. No. 07/180,195 filed Apr. 11, 1988, now abandoned.

BACKGROUND

Only three possible modes of procedure are available to protect a facility from direct lightning strokes. They are:

1. Eliminating the source of the stroke by discharging the thundercloud charge or the associated induced charge on the earth's surface.

2. Decreasing the electrostatic field caused by a thundercloud charge around the object to be protected by creating a space charge of the opposite polarity.

3. Providing a bypass path for lightning strokes, thereby preventing direct strokes into the facility.

Various lightning stroke protection devices are known. Some touch upon dissipative concepts and strike prevention. Those teachings include the following U. S. references:

| 1) J. S. Barber | 1,096 | March 5, 1839 |
| 2) Chambers | 234,173 | November 9, 1880 |
| 3) Knudson | 234,484 | November 16, 1880 |
| 4) Newhall | 250,950 | December 13, 1881 |
| 5) Upton | 315,679 | April 14, 1885 |
| 6) Vail | 357,050 | February 1, 1887 |
| 7) Cage | 1,743,526 | January 14, 1930 |
| 8) Carpenter | 4,180,698 | December 25, 1979 |
| 9) Gillem | 4,605,814 | August 12, 1986 |

A brief description of the relevant prior art is discussed below:

1. Barber — A wood insulator holds a copper umbrella atop the facility. No conduction to ground is provided. Therefore, the effectiveness of this lightning rod is questionable.

2. Chambers — A sealed oil/gas storage tank is affixed with two concentric circles of lightning rods. Short wires project both upwardly and downwardly from the concentric circles. However, the entire lightning rod assembly is insulated from the ground. Therefore, the effectiveness of this lightning rod is questionable.

3. Knudson — An oil tank lightning rod and dissipation system uses water spray to reduce gas concentrations over the tank. The assembly is grounded to earth to serve as a lightning rod. Finally, the ground is saturated with water. This is an effective lightning protection system since it dissipates the charge from above the tank thereby offering stroke prevention. No attention to ionizer points is made.

4. Newhall — Lightning protection for an oil tank is provided by mounting a pole atop the tank. The pole is insulated from the tank. The pole has a height equal to the radius of the tank. The pole supports a conductive tip and copper cables which are connected in an umbrella fashion to the ground. This is an effective lightning protection system since it dissipates the charge from above the tank. Additionally, a copper rod is coiled around the oil inlet and outlet pipes to prevent strokes that hit the pipes from reaching the tank.

Newhall describes prior art consisting of a series of poles erected around the tank. A wire network was formed connecting the tips of the poles. No attention to ionizer points is made.

5. Upton — The primary lightning conductor taught by Upton is barbed wire. The barbs serve to dissipate the electricity into the air evenly along the wire in addition to the dissipation into the ground. Upton prefers all the barbs pointing in one direction away from the facility. A network of barbed wire is supported over the facility by poles. A short interval exists between short barbs. No attention to design dimensions is made.

6. Vail — Overhead electric utility wires are protected by an independent strand of barbed wire hung over it and grounded. The ground wires are run down the utility poles and attached to underground copper plates. No attention to design dimensions is made.

7. Cage — Cage deals with the conditions precedent to the flash for the purpose of preventing the flash itself. Cage prefers to surround the facility above and peripherally with a small diameter wire having sharp points. The sharp points tend to dissipate mounting charges into the atmosphere. Cage connects the wire network to the facility before grounding. Floats inside an oil tank may also be connected to the network.

Key to Cage's teaching is that the number of "barbs" in his wire is adequate to dissipate and transfer by ionization the total charge building up between the cloud and facility at least as fast as that charge tends to build up. Furthermore, the "barbs" in his wire are adequate to dissipate and transfer by ionization the total charge building up between the cloud and facility at least as fast as that charge tends to build up. Furthermore, the "barbs" must be spaced apart far enough so as to get little or no interference between their concentrated effects on the lines of force from the cloud. Cage's dissipating systems allow the charge differential between the cloud and earth to flow back to the cloud before the flashover point is reached.

Cage suggests a slightly wider spacing when parallel wires are used as opposed to single wires. Cage teaches greater dissipation rates at high elevations of the wire and "barbs". Therefore, multiple tall towers are recommended.

In summary, Cage teaches offering a large charge transferring area having multiple barbs to the charged cloud. However, no precise parameter designs are taught which maximize these basic teachings.

8. Carpenter - Carpenter teaches surrounding the facility with an underground current collector. This current collector diverts the ground charge up to an ionizer on a centralized tower in the center of the current collector. Carpenter stresses forming uniform field shapes over the facility, thus avoiding upward going leaders. Various estimates are provided for figuring facility area protection from varying shaped ionizer towers.

9. Gillem introduces a toroidal wire brush concept. This acts as the dissipative medium for high towers. Wires are packed at up to 250 per inch to act as ionizer points. However, no attention has been paid to the point interference phenomena first identified by Cage and refined by Carpenter. This has resulted in a series of failures (strokes to it).

Lightning protection-concepts may be divided into two categories, stroke collection/diversion and stroke prevention. The stroke collection/diversion systems are best typified by the conventional lightning rod systems. The lightning rod systems consist of an air terminal, a downconductor and a grounding system. Of the prior art previously listed. Barber, Chambers, Knudson and Newhall all deal with different forms of stroke collection and grounding concepts. They teach various forms of lightning rod systems. Vail teaches the use of conventional barbed wire for the creation of air ionization terminals for use with a lightning collections and grounding system.

Stroke prevention systems are those that prevent a stroke from terminating within the protected area or on the protecting system. These prevention systems are usually referred to as dissipative systems. Upton was the first to consider this concept. Only a gradient line exists between a lightning rod and a lightning dissipator. Even a single point lightning rod acts to some extent to dissipate a change to atmosphere before a lightning stroke, thus offering a small amount of prevention. Cage then refined the concept and explained some of the operational principles and identified some of the critical parameters. Cage did not define the parameter interrelationships. Carpenter developed one form of dissipating wire and a new charge collection concept. Carpenter expanded on the parameter interrelationships.

All of the aforementioned prior art identified concepts but did little toward presenting specific design parameters for the ionizer itself. Failures within the stroke prevention art pointed out the need for more specific design data.

The Dissipation Array System, subsequently referred to as DAS, is a true lightning stroke prevention system. The operational concept is presented within this disclosure.

Failures of the barbed wire based systems and certain dissipation wire systems pointed out the need to determine the required design parameters for each specific application. The barbed wire systems proved to be less than 60 percent effective. Carpenter's dissipation wire proved to be better than 99 percent effective. A study of DAS systems installed since Carpenter's 1979 patent revealed some inherent weaknesses in the early designs. Subsequent tests provided the data required to identify these weaknesses and produce an effective DAS.

SUMMARY OF INVENTION

Various fundamental and operational concepts and elements are suitable to the present invention. Therefore, U.S. Pat. No. 4,180,698 to Carpenter is herein incorporated by reference.

The main object of the present invention is to define the DAS designs that will achieve 100 percent effective stroke prevention systems for various specific applications. These designs are the result of studies derived from DAS installations operational since the 1979 patent. Additional tests were performed in an electrostatic simulator, constructed specifically to determine the parametric requirements for each DAS application.

Some of the application parameters covered by the present invention include, but are not limited to:

1. Protection of Power Transmission and Distribution Systems;
2. Protection of Towers;
3. Protection of Oil Storage Tanks and Reservoirs; and
4. Protection of Electrical Substations and like large areas.

Further objects of the present invention include:

1. Defining the total number of dissipation points required per unit area protected;

2. Defining the proper spacing between the dissipation points;
3. Defining the dissipation wire parameters as a function of application including point spacing and length above the interconnecting wires;
4. Defining the spacing between two or more dissipation wires as a function of application;
5. Defining the shape of various dissipator assemblies by application; and
6. Defining some potential applications for these various configurations.

Other objects of this invention will appear from the following description and appended claims, reference being had to the accompanying drawings forming a part of this specification wherein like reference characters designate corresponding parts in the several views.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DETAILED DESCRIPTION

Figure 8:
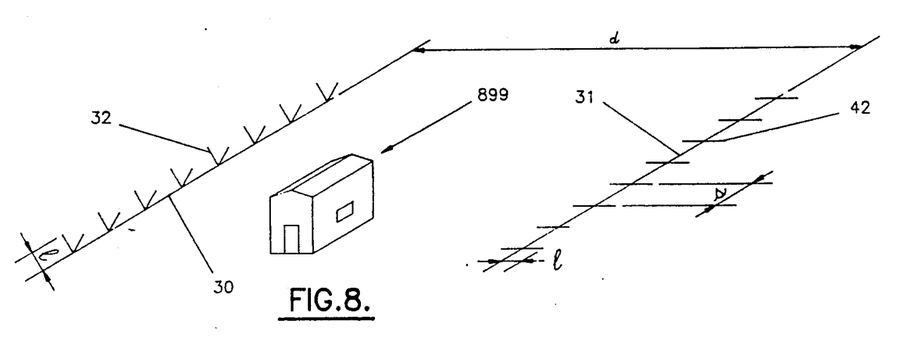
FIG. 8 is a schematic of the basic building block for most Dissipation Array systems (DAS). the multipoint dissipation wire (30). The parametric values of the ionizing member (32), height (1) and spacing (s) are varied to achieve the required performances as a function of the specific DAS application.

Referring first to FIG. 8, the multipoint dissipation wires (30 and 31) are a basic DAS building block. The multipoint dissipation wires (30 and 31) contain ionizing members (32 and 42). Simulated tests have shown that the height (l) and space (s) parameters must be adjusted to properly perform in a given application and DAS configuration. As examples, the ionizing member (32) parameter height (l) should be in excess of 7 cm. Optimum performance occurs with 11–12 cm, where s is in the range of 7 to 12 cm. Longer heights (l) yield little improvement. Shorter heights (l) become less effective, particularly below 5 cm. Ionizing members (32 and 42) having spacings (s) between 5 and 20 cm perform best. However, the best spacing (s) is also dependent on the separation distance (d) between adjacent multipoint dissipating wires (30 and 31). The smaller the distance (d) calls for the smaller spacing (s) to the lower limit of about 5 cm for maximum performance. The separation distance (d) should be no less than about 10 cm but can extend to several meters depending on the application. Ionizing members 32 may be used for the closer separation distances d, and ionizing members 42 for distances d in excess of 20 cm. Other arrangements of these Parameters are feasible, but will function with less efficiency.

Figure 1:
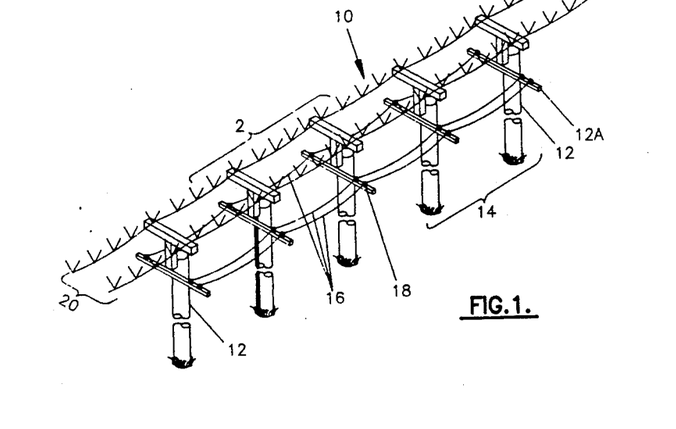
FIG. 1 is a perspective view of a DAS as applied to an electrical overhead transmission/distribution line for a random length thereof. This design is also called the Dual Dissipator System (DDS).
Figure 2:
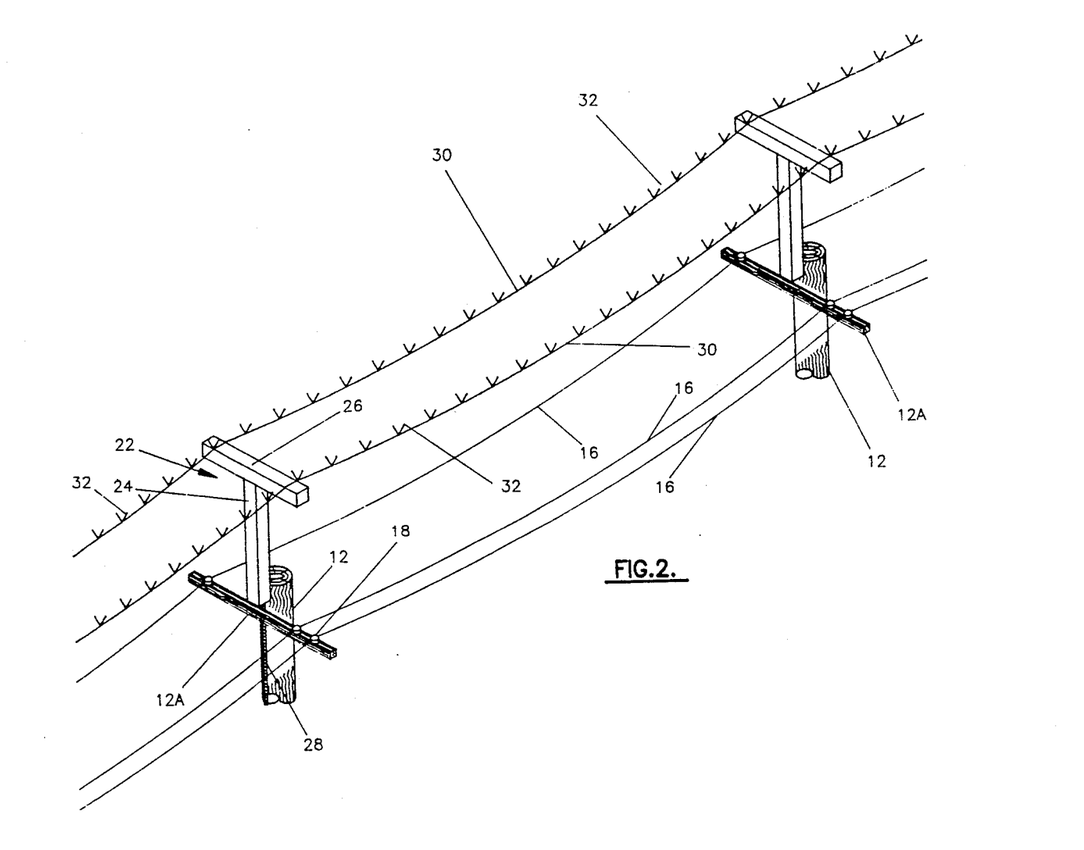
FIG. 2 is a perspective view of an enlarged detail length of the portion 2 of the DDS shown in FIG. 1.

Referring next to FIGS. 1 and 2, a typical electrical overhead distribution line 10 comprising poles 12 erected with conventional spacings 14 from each other and carrying crossarms 12A with insulators 18 is depicted. A dual dissipator system (DDS) 20 is shown with its mounting member assembly 22.

The mounting member assembly 22 includes a vertical strut 24 having a horizontal spacer 26 normally mounted at its midpoint on top of the strut 24. The height of horizontal spacer 26 above conductors 16 is generally in excess of ½ meter. The mounting member assembly 22 may be in the form of the tee illustrated or other shapes appropriate to achieve the required elevation above the conductors 16 and the spacing between the multipoint dissipation wires 30 (or 31). The length of the horizontal spacer 26 is selected to provide optimum distance (d) between the multipoint dissipation wires 30 (or 31) as shown in FIG. 8. Distance (d) should be not less than ½ meter nor more than one meter for a single set of transmission or distribution lines for best performance. Although other spacing will function to some degree, there is created a risk of failure to prevent the stroke. Connections to a grounding wire 28 must be made to the mounting member assembly 22 or directly to the multipoint dissipation wires 30. Additional multipoint dissipation wires 30 (or 31) may be used where more than one set of phase conductors are used or large separation distances exist between them. Vertically constructed lines may be protected in a similar manner.

Figure 3:
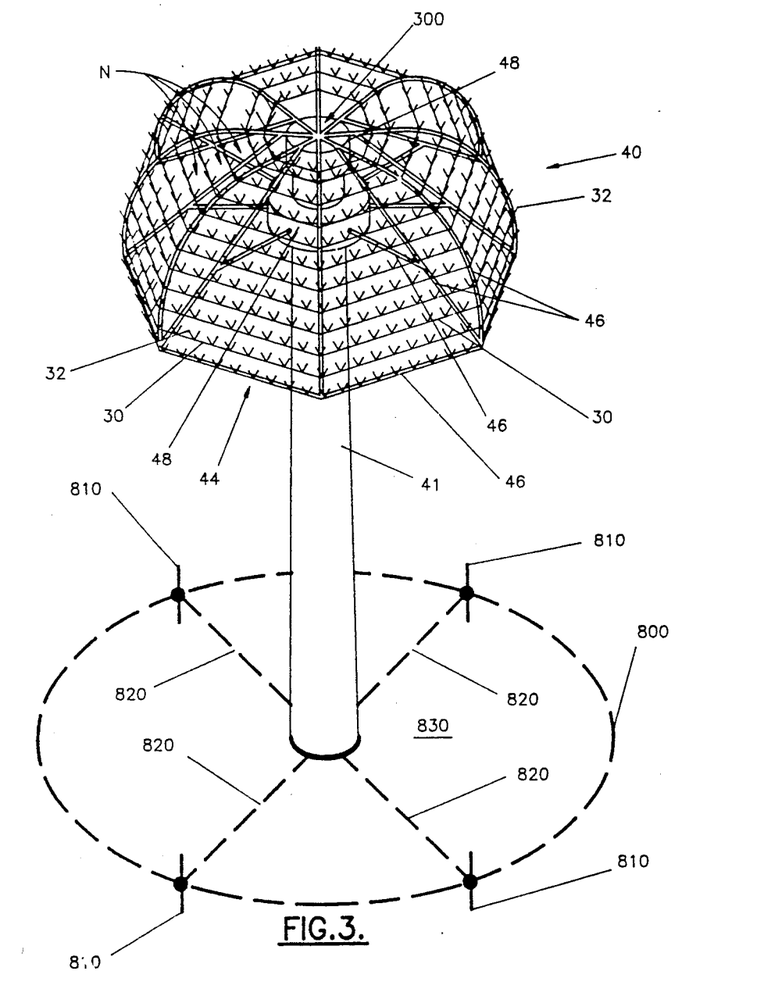
FIG. 3 is a front elevational view of a hemispherically-shaped array mounted on a lightning mast, tower, pole, or a similar structure.

Referring now to FIG. 3, a hemispherical dissipation array 40 is designed for convenient installation on many types of supporting structures such as towers, poles and stacks. The Dissipation Array 40 is composed of the ground current collector wire 800 buried to a depth of about 25 centimeters and the short, about one meter long, rods 810 connected at one end with wire 800. The rods 810 are spaced at intervals of about ten meters. The enclosed area 830 is further integrated by a net of cross conductors 820. Any surface structures (not shown) inside area 830 would also connect to cross conductors 820. The enclosed area 830 becomes an integrated electrical island which is surrounded by less conductive soil (not shown). Dissipation array 40 differs from U.S. Pat. No. 4,180,698 in that it has been found necessary to extend the skirt 44 downward to nearly a full 90 degrees below the apex 300 for many applications. In addition, the diameter of the skirt 44 and the wire spacing (N) was changed to provide the optimum number of ionizing members 32 while optimizing the production of ions. To achieve these objectives, a skirt 44 comprises industrial structural members 46, top zone 48 and pole 41. Dissipation wires 30 (or 31) are arranged in parallel. Space N ranges from 5 to 20 cm. Fifteen cm for N is optimum for most applications while other spacings will function with reduced performance. Skirt 44 may take on various length to height ratios and curvature gradients. It may also have various size flat or open sections in its center to accommodate the mounting tower, pole or stack. Where used alone, this DAS configuration must provide a minimum dissipation area of about 15 square meters. The requisite ionizing member 32 density ranges from 1000 to 2000 per square meter.

Figures 4, 5:
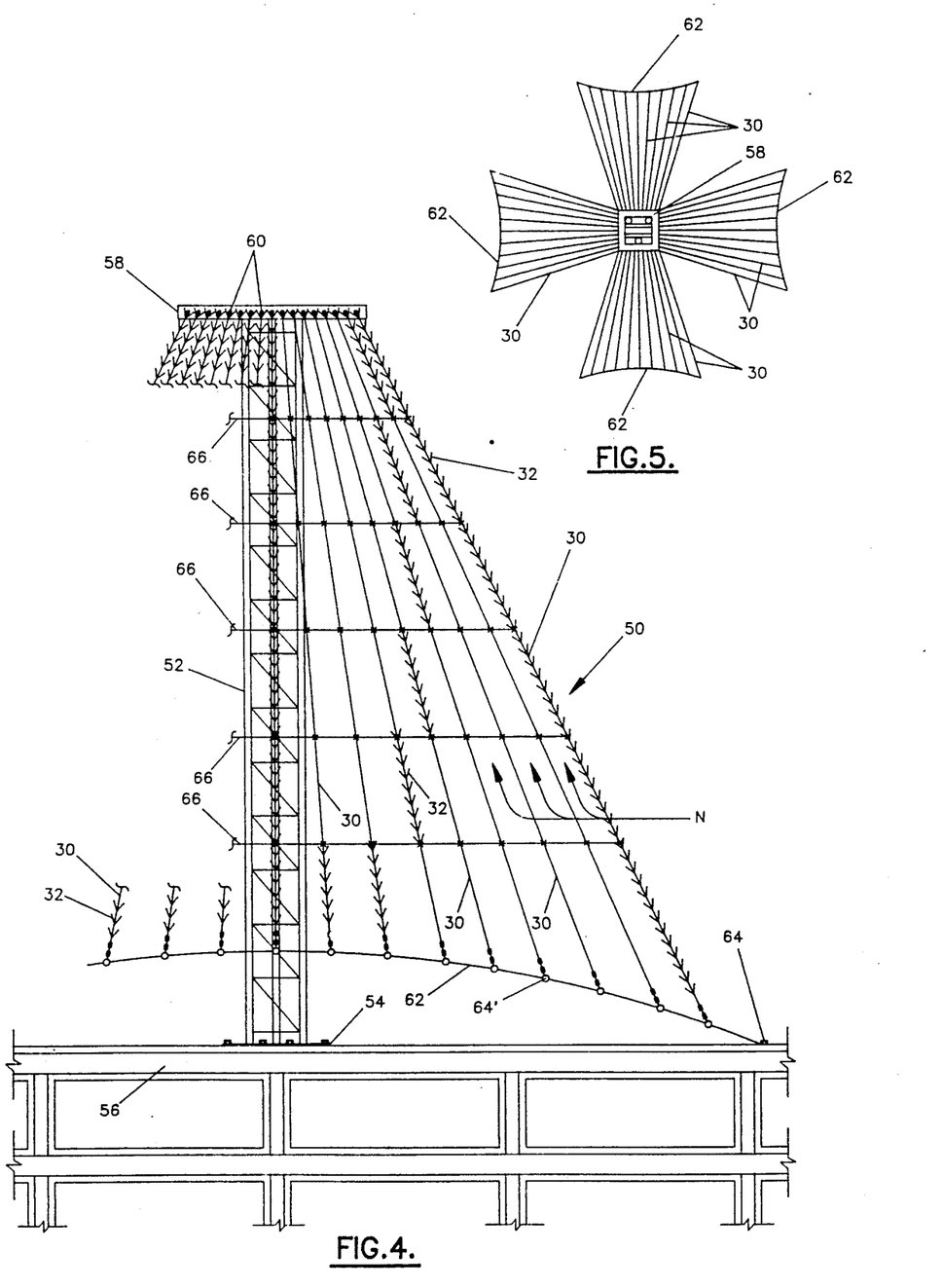
FIG. 4 is a top perspective view of a typical pyramidal or trapazoidal array for use on the top of an existing structure to be protected.
FIG. 5 is a schematic top plan view of the full array of the design shown in FIG. 4.

FIG. 4 presents an alternate design 50 for protecting tall towers, buildings, tanks and other structures where it can be conveniently assembled. This DAS design 50 is made up of trapezoidal shaped panels 58-30-62. Usually one, two, three or four panels are used for the DAS. In FIG. 4 the panel 58.30.62 is affixed to a support structure, tower 52, at the upper spreader bar 58. Spreader bar 58 has a plurality of holes 60 near its lower edge. A bottom spreader 62 is strung across and fastened to the protected structure 56 at anchor points 64. Dissipation wires 30 have ionizing members 32. Dissipation wires 30 are strung from holes 60 to corresponding anchor points 64' on the bottom spreader 62 thus completing the subject DAS. The dissipation wire 30 spacings N are set so that the separation distance N is in excess of ½ meter for at least 80 percent of the length of dissipation wire 30. Interim spreaders 66 may be made of dissipation wire 30 to assure the desired separation for the full length of each dissipation panel 58-30-62.

FIG. 5 illustrates another DAS configuration using multiple panels from FIG. 4. The angle of these panels may be varied from 10 degrees to over 45 degrees away from the support structure 52.

Figure 6:
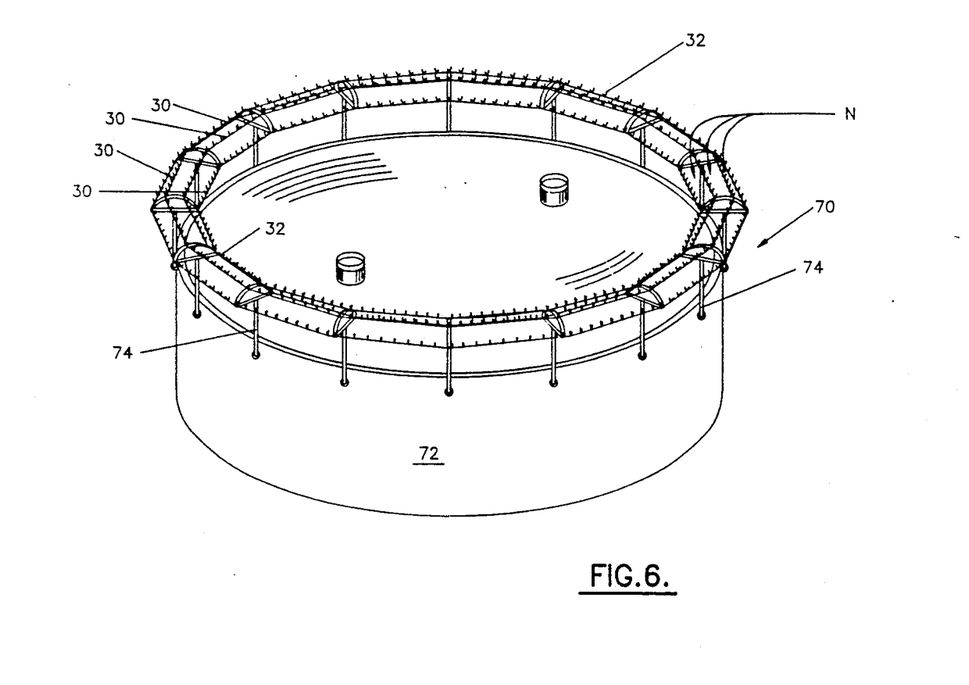
FIG. 6 is a top perspective view of the DAS configuration used for flammable storage.

The DAS configuration 70 in FIG. 6 is suited for the protection of structures having a circular or a polygonal outline. A flammable storage reservoir 72 is shown for this example. T-shaped supports 74 are installed along the upper periphery of the reservoir 72. A plurality of dissipation wires 30 having the ionizing members 32 are fastened to the horizontal leg of said T-shaped supports 74. Each dissipation wire 30 forms a closed-circuit type circular loop. Multiple circular loops are positioned concentrically at a discrete, predetermined radial distance N. Each union of dissipation wire loops 30 and each connection between dissipation wire loops 30 and T. shaped supports 74 and between the latter and the reservoir 72 are securely bonded. The reservoir 72 is securely grounded.

The FIG. 6 configuration requires a minimum of 3 dissipation wires 30 for tanks in excess of 100 ft. in diameter. Four dissipation wires 30 are required for smaller tanks. For best results, the dissipation wires 30 should be separated by a distance N ranging from 15 to 20 cm. The ionizing members 32 should be at 15 cm separation. The height l should be 10 cm as shown in FIG. 8. Ionizing members 32 can be seen to point angularly away from the protected facility 899.

Figure 7:
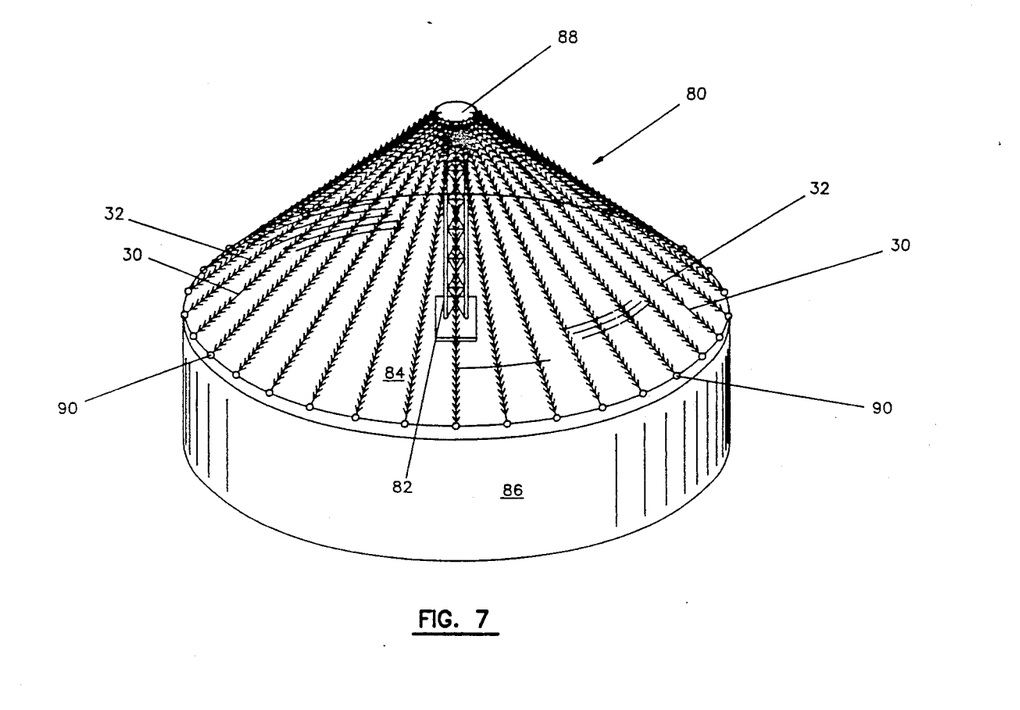
FIG. 7 is a top perspective view of a conically-shaped DAS used for the protection of a cone roof flammable storage reservoir.

To assure proper protection of conical or flat roof reservoirs for flammables or other sensitive products, the design 80 in FIG. 7 is appropriate. A tower 82 (or pole) is mounted axially and upwardly in the center of the top 84 of the reservoir 86. A bracket 88 mounted on the top of the tower 82 is adapted for the fastening of the dissipation wires 30 having ionizing members 32. Dissipation wires 30 are strung, fastened and bonded to suitable attachment positions 90 along the top periphery of the reservoir 86. All connections between the dissipation wires 30 and the respective points of attachment are securely bonded directly as well as indirectly to the reservoir 86. Reservoir 86 is securely grounded.

The dissipation wires 30 separation criteria, ionizing member spacing, and ionizing member height are somewhat more flexible but should range between the values identified in FIG. 4.

Figure 9:
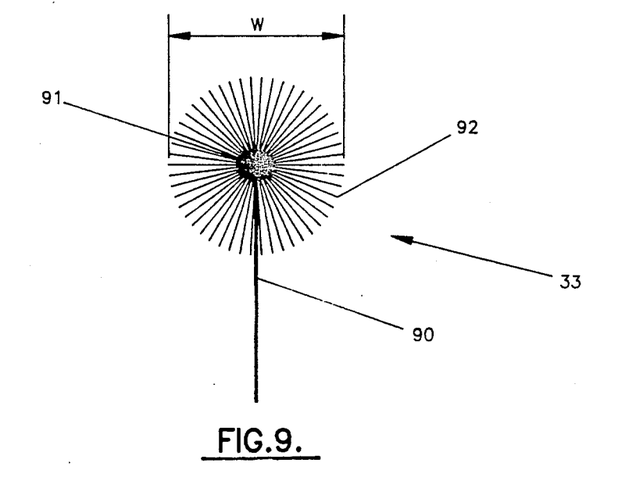
FIG. 9 is a front elevational view of an alternate form of multipoint dissipator, the Spline Ball Ionizer (33). The Spline Ball Ionizer is used autonomously or in concert with others, to make up a DAS for various applications where low cost protection is required.

FIG. 9 shows a novel DAS named the Spline Ball Ionizer 33. It is relatively low cost to manufacture and install. The Spline Ball Ionizer 33 comprises a stem 90 and a ball 91. The ball 91 is composed of multiple branches 92. Branches 92 fold downward around stem 90 for ease of packaging and installation. Ball 91 and stem 90 are electrically conductive, preferably made of copper. The diameter w of ball 91 ranges from 20 to 50 inches varying with the width of the tower it protects.

Figure 10:
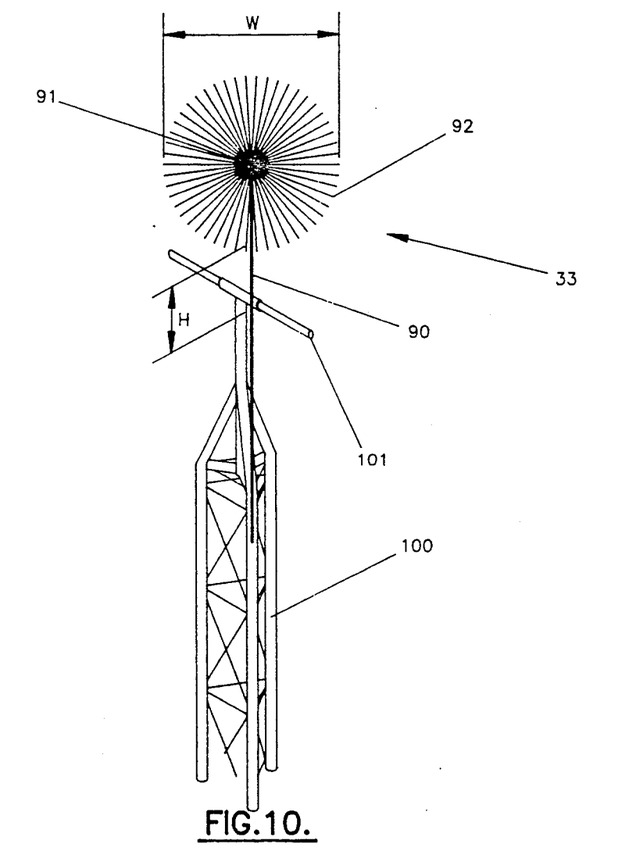
FIG. 10 is a top perspective view of the Spline Ball Ionizer of FIG. 9 protecting a tower.

FIG. 10 shows a tower 100 holding an instrument bar 101 high above the ground. The Spline Ball 33 is mounted directly to the tower 100 and is grounded thereto. The height H of the lowermost portion of the ball 91 above the instrument bar 101 should equal the diameter w of the ball 91.

In operation, the Spline Ball 33 dissipates the electrostatic charge caused by a passing cloud. The electrostatic charge passing along the ground is raised up and over the tower 100 by means of branches 92 which function as ionizer points. Dissipation of the ground charge is also accomplished, thus preventing a lightning stroke on the tower 100. The spline Ball 33 is also a cost effective way to protect a house.

The foregoing examples for practicing the present invention accomplish the bleeding off of nature s electrostatic charge through corona discharge. This bleeding off discharges the protected area and creates a space charge which functions as a protective shield to prevent direct lightning strokes. A high degree of probability of prevention of lightning strokes is thereby achieved.

It is understood that the described embodiments of the present invention are but illustrative, and that variations, modifications and alterations are feasible within the spirit of these teachings.

I claim:

1. A hemispherical dissipation array system for preventing a lightning stroke between a cloud and a protected facility, comprising:
   at least one discrete hemispherical ionizer structure rising above the earth's surface and the protected facility, thereby forming a uniform field shape over the protected facility;
   an endless ground current collector structure connected to the ionizer structure and having at least one downwardly extending grounded charge collecting rod, thereby forming an electrically floating island around the protected facility;
   said ionizer structure having a skirt extending downwardly approximately 90 degrees below the apex;
   said ionizer structure further comprising a series of parallel wires spaced apart a distance ranging from 5 to 20 cm, thereby forming an umbrella shaped hemispherical ionizer structure of about 15 square meters;
   said parallel wires having a number of equally spaced ionizer member points ranging from 1000 to 2000 per square meter;
   said ionizer member points each having two wire segments angularly facing upward and having a length of approximately 12 cm and said ionizer member points having equidistant spacing from one another ranging from 5 to 20 cm.

2. A dissipation array system for preventing a lightning stroke between a cloud and a protected facility, comprising:
   at least one trapezoidal panel mounted in a vertical manner atop the protected facility and connected to ground;
   said trapezoidal panel comprising converging wires spaced apart a distance in excess of ½ meter for at least 80 percent of their lengths;
   said converging wires each including ionizer points spaced apart distances ranging from 5 to 20 cm, wherein said parallel wires cause the electrical field between the cloud and the protected area to be bent over the protected area and partially dissipated to atmosphere, thereby preventing a lightning stroke.

3. The dissipation array system of claim 2, wherein said vertical manner comprises an angle ranging from 10 to 45 degrees from perpendicular.

4. A Dissipation Array System for preventing a lightning stroke between a cloud and a protected facility, comprising:
   a ball;
   said ball comprising conducting branches emanating outward from a central point;
   a grounded mounting stem holding said ball from its central point above the protected facility;
   said branches folding downward from hipping;
   said grounded mounting stem being of a length allowing the bottom of the ball to be held at a height above the protected facility equal tot eh diameter of the ball.

5. The Dissipation Array System of claim 4, wherein the protected facility comprises a tower and wherein the diameter of the ball approximates the width of the tower.

* * * * *

UNITED STATES PATENT AND TRADEMARK OFFICE
CERTIFICATE OF CORRECTION

PATENT NO. : 5,043,527
DATED : August 27, 1991
INVENTOR(S) : Carpenter, Jr.

It is certified that error appears in the above-indentified patent and that said Letters Patent is hereby corrected as shown below:

In claim 4, column 8, line 48, correct "tot eh" to read "to the".

Signed and Sealed this

Fourth Day of August, 1998

Attest:

BRUCE LEHMAN

Attesting Officer

Commissioner of Patents and Trademarks